(12) United States Patent
Danzberger et al.

(10) Patent No.: US 11,916,465 B2
(45) Date of Patent: Feb. 27, 2024

(54) COMPENSATING DEVICE HAVING A TORSION SPRING ON THE ELECTRIC MOTOR

(71) Applicant: Robert Bosch GmbH, Stuttgart (DE)

(72) Inventors: Michael Danzberger, Zeilitzheim (DE); Andreas Rueb, Tamm (DE); Christoph Janssen, Bischofsheim (DE); Efim Kuhn, Grettstadt (DE); Fan Yang, Blaustein (DE); Markus Groganz, Wasserlosen (DE); Peter Schlegel, Obernzenn (DE); Sebastian Siedler, Escherndorf (DE); Thomas Dickmann, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/808,465

(22) Filed: Jun. 23, 2022

(65) Prior Publication Data

US 2023/0006510 A1 Jan. 5, 2023

(30) Foreign Application Priority Data

Jul. 5, 2021 (DE) ...................... 10 2021 207 034.5

(51) Int. Cl.
*B25J 17/02* (2006.01)
*H02K 7/14* (2006.01)

(52) U.S. Cl.
CPC ............ *H02K 7/14* (2013.01); *B25J 17/0208* (2013.01)

(58) Field of Classification Search
CPC .......................... B25J 17/0208; B25J 17/0225; B25J 17/0233; B25J 19/065; B25J 19/083
See application file for complete search history.

(56) References Cited

U.S. PATENT DOCUMENTS 10,011,019 B1 * 7/2018 Strauss .................. B25J 15/022
10,668,631 B2 * 6/2020 Rueb ..................... B25J 17/0225

FOREIGN PATENT DOCUMENTS

DE     10 2015 214 003 A1     1/2017

* cited by examiner

*Primary Examiner* — Gregory Robert Weber
(74) *Attorney, Agent, or Firm* — Maginot, Moore & Beck LLP

(57) ABSTRACT

A compensating element having a first and a second assembly, wherein a locking mechanism is provided which can be switched over between a first and a second operating state. In the first operating state, the first assembly is connected fixedly to the second assembly and, in the second operating state, the first and second assemblies are connected to each other via a spring mechanism in such a manner that they are movable relative to each other. The locking mechanism includes an electric motor that can be used to switch over between the first and the second operating state. A locking ring is or is not braced against at least three balls depending on its rotational position with respect to a center axis. The locking ring is connected in terms of rotary drive to the electric motor via a torsion spring which is elastic with respect to the center axis.

10 Claims, 4 Drawing Sheets

COMPENSATING DEVICE HAVING A TORSION SPRING ON THE ELECTRIC MOTOR

This application claims priority under 35 U.S.C. § 119 to application no. DE 10 2021 207 034.5, filed on Jul. 5, 2021 in Germany, the disclosure of which is incorporated herein by reference in its entirety.

The disclosure relates to a compensating device.

BACKGROUND

DE 10 2015 214 003 A1 discloses a compensating device having a first and a second assembly. The first assembly is fastened, for example, to an articulated robot, with, for example, a gripper being fastened to the second assembly. In a first operating state, the second assembly is connected fixedly to the first assembly. In a second operating state, the second assembly is supported resiliently on the first assembly. An electric motor is used to switch over between the first and the second operating state. The corresponding locking mechanism comprises a plurality of balls which are arranged uniformly distributed about a center axis of the compensating element. The balls can be clamped by means of a locking ring such that the first operating state is set. The electric motor brings about rotation of the locking ring in order to switch over between the first and the second operating state.

If the compensating device is used in an automated manufacturing system, it is desirable to minimize the time which is required for switching over between the first and the second operating state so that the productivity of the manufacturing system is at maximum. In particular when switching over from the second into the first operating state, a considerable impact stress on the electric motor is caused as a result. Very rapid switching-over operations may destroy the electric motor within a short time.

SUMMARY

One advantage of the present disclosure consists in that the electric motor has a long service life even if a very rapid switch is made between the first and the second operating states.

According to the disclosure, it is proposed that the locking ring is connected in terms of rotary drive to the electric motor via a torsion spring which is elastic with respect to the center axis. The torsion spring lessens the above-discussed impact in such a manner that said impact exerts only a small stress on the electric motor. As a result, the service life of the electric motor increases.

The electric motor can comprise a transmission which preferably brings about a speed-reducing ratio. The spring mechanism preferably comprises at least one spring which is installed under pretension in the direction of the center axis between the at least three balls and the first assembly such that the at least three balls are in each case pretensioned toward the second assembly. A single annular undular washer can be provided. A separate pressure ring can be provided which directly touches the at least three balls, wherein the at least one spring is installed under pretension between the pressure ring and the first assembly. In the last case, use is preferably made of at least three helical compression springs which are arranged distributed uniformly about the center axis.

The locking ring preferably has a flat bearing surface which is oriented perpendicularly to the center axis, it being supported on the first assembly via the bearing surface. Other forms of the bearing surface are also conceivable provided that they are rotationally symmetrical with respect to the center axis such that the locking ring is rotatable with respect to the center axis. The locking ring preferably has a pressure surface which can directly touch the at least three balls. The pressure surface and the bearing surface are preferably arranged on opposite sides of the locking ring in the direction of the center axis. The thickness measured between the bearing surface and the pressure surface in the direction of the center axis preferably varies periodically over the circumference of the locking ring. The number of periods is preferably equal to the number of balls.

Advantageous developments and improvements of the disclosure are specified below.

It can be provided that the electric motor has a rotatable drive journal which is arranged concentrically with respect to the center axis, wherein the locking ring surrounds the drive journal, and wherein the torsion spring is arranged between the drive journal and the locking ring, as viewed radially with respect to the center axis. This means that the torsion spring requires particularly little construction space. Furthermore, the end position, explained further below, of the torsion spring can be easily realized.

It can be provided that the torsion spring comprises a single spring wire which is wound spirally with respect to the center axis, wherein a first end of the spring wire is connected to the drive journal for rotation therewith, and wherein a second end of the spring wire opposite the first end is connected to the locking ring for rotation therewith. Such a torsion spring requires little construction space and nevertheless over the long term withstands the impact stress during operation of the compensating element. The spring wire is preferably composed of hardened spring steel. It has a constant cross-sectional shape, preferably over its entire length, which is mostly preferably circular or rectangular. The spring wire preferably has between two and four winding revolutions.

It can be provided that the spring wire is bent over at the first end and/or at the second end in each case at a right angle, wherein the corresponding bent-over portion engages at least indirectly in a form-fitting manner in the drive journal or in the locking ring. This makes it possible in a cost-effective and space-saving manner for the spring wire to be carried along at the first and/or second end for rotation with said drive journal or locking ring. The bent-over portion at the second end preferably engages directly in the locking ring, in particular in a circular-cylindrical bore arranged there. The right angle mentioned is preferably between 80° and 100°, mostly preferably 90°.

A separate carry-along part can be provided which is connected fixedly to the drive journal, wherein the bent-over portion engages at the first end directly in a form-fitting manner in the carry-along part. This means that the standardized drive journal on the electric motor does not need to be changed. Furthermore, the carry-along part assists in the provision of the end position explained below by the carry-along part merging with its outer circumferential surface preferably without a step and gap into the circular-conical surface on the locking ring. The carry-along part is clamped against the drive journal preferably by means of a clamping screw.

It can be provided that the carry-along part is clamped against the drive journal by means of a threaded pin, wherein the threaded pin is oriented radially with respect to the center axis, and wherein the threaded pin is accommodated in the carry-along part in a manner completely recessed with respect to an outer circumferential surface of the carry-along part. This provides a clamping of the carry-along part, the clamping not obstructing the movement of the torsion spring and not being damaged whenever the torsion spring has reached the end position. The threaded pin is preferably clamped against a flattened portion on the drive journal.

It can be provided that the spring wire is bent spirally in such a manner that the first and the second end are spaced apart from each other in the direction of the center axis. The corresponding distance is preferably selected to be of such a size that the individual winding revolutions are arranged next to one another in the direction of the center axis when the torsion spring is tensioned into the end position, where the latter preferably lies against the circular-conical surface. In the end position, adjacent winding revolutions preferably lie directly on one another in the direction of the axis of rotation, thus resulting in a particularly stiff end position.

It can be provided that the spring wire is wound spirally in such a manner that it defines a circular cone on the other side of the first and the second end. By this means, the above-explained distance between the first and the second end can be realized in a simple manner.

It can be provided that the torsion spring is configured in such a manner that it is rotatable from an untensioned neutral position by 30° to 90° as far as an end position, wherein, from the end position, a stiff rotary entrainment takes place between the drive journal and the locking ring if the direction of rotation of the drive journal remains the same. The direction of rotation mentioned preferably corresponds to a displacement from the second into the first operating state. The torsion spring therefore has an impact-damping effect between the neutral position and the end position. From the end position, the locking mechanism thus moves as though no torsion spring at all were present. In this adjustment region, the actual locking into the first operating state takes place. This is in practice not interfered with by the torsion spring.

It can be provided that the spring wire in its end position lies with its inner circumferential surface on the locking ring. The desired stiff rotary entrainment can thereby be realized in a simple manner if the drive journal is moved beyond the end position.

It can be provided that the locking ring has a surface which is in the form of a circular cone with respect to the center axis and on which the spring wire lies in its end position. The circular-conical surface is particularly readily adapted to the above-explained conical shape of the torsion spring, thus resulting in particularly stiff contact.

It goes without saying that the features which have been mentioned above and those which have yet to be explained below can be used not only in the respectively stated combination, but also in other combinations or on their own without departing from the scope of the present disclosure.

BRIEF DESCRIPTION OF THE DRAWINGS

The disclosure will be explained in more detail below with reference to the attached drawings, in which.

DETAILED DESCRIPTION

Figure 1:
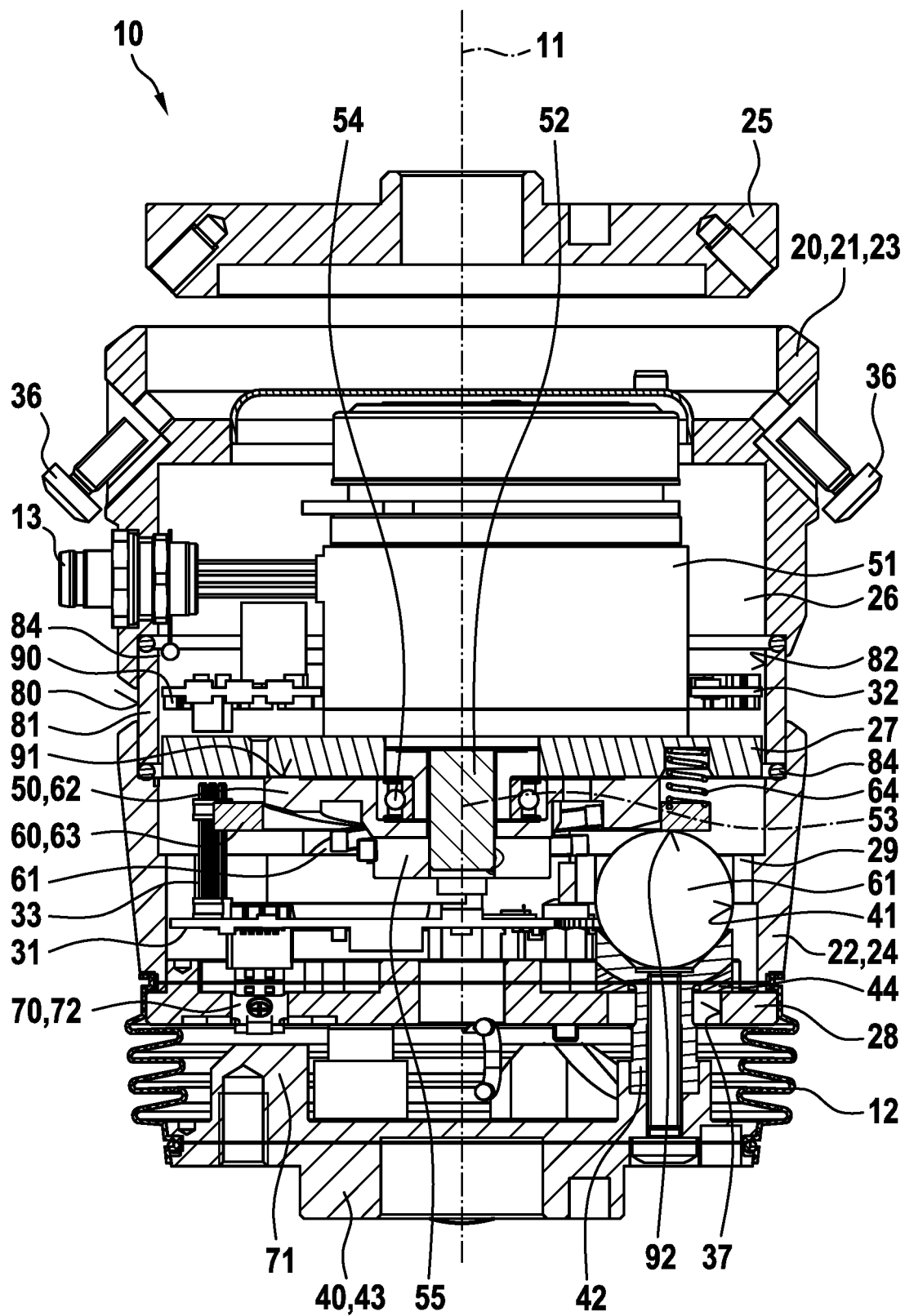
FIG. 1 shows a sectional view of the compensating element according to the disclosure.

FIG. 1 shows a sectional view of the compensating element 10 according to the disclosure. The corresponding sectional plane contains the center axis 11, the latter running through the center point of a ball 61. The compensating element 10 comprises a first and second assembly 20; 40 which are clamped to each other in the first operating state, illustrated in FIG. 1. In the second operating state, the first and the second assembly 20; 40 are movable relative to each other, with a variable gap between the first and the second assembly 20; 40 being covered by a ring-like expansion bellows 12.

The first assembly 20, the upper one in FIG. 1, comprises a first and a second housing body 21; 22 which are both cup-like with respect to the center axis 11. Their open sides face one another, and therefore they jointly delimit a cavity 26.

The first housing body 21 comprises a ring-like first main part 23 which forms a portion of the outer circumferential surface of the first assembly 20. Furthermore, the first assembly 20 comprises a first fastening flange 25 which is fixedly connected to the first main part 23 by means of a plurality of screws 36, which are arranged obliquely with respect to the center axis 11, with it forming the base of the cup shape mentioned. The compensating element 10 is preferably produced in a plurality of variants which differ in respect of the shape of the first and/or the second fastening flange 25; 43 such that the compensating element can be used for different robots and different grippers.

The second housing body 22 comprises a ring-like second main part 24 and a second plate 28. The second main part 24 forms a portion of the outer circumferential surface of the first assembly 20. The second plate 28 forms the base of the cup shape mentioned.

A luminous ring 81, the outer circumferential surface of which forms a luminous surface 80, is accommodated between the first and the second main part 23; 24 in the direction of the center axis 11. The luminous ring 81 runs with a constant, rectangular cross-sectional shape in a circular manner about the center axis 11. It is preferably composed of a light-scattering polycarbonate. On its two face sides facing in the direction of the center axis 11, a respective sealing ring 84 is arranged towards the first and second main part 23; 24.

The luminous ring 81 surrounds a first plate 27 which is arranged in a fixed position within the first assembly 20. An electric motor 51 which comprises a transmission is connected fixedly to the first plate 27, the drive journal 52 of said transmission penetrating the first plate. The axis of rotation 53 of the electric motor 51 coincides with the center axis 11 of the compensating element. The transmission means that the axis of rotation 53 of the electric motor 51 is arranged somewhat eccentrically on the electric motor 51 itself. The drive journal 52 is already mounted rotatably within the electric motor 51, the drive journal additionally being provided with a further radial rolling bearing 54 which is accommodated in the first plate 27. The forces acting on the locking ring 62 are intended to be optimally supported by this means. The second ring 62 is provided integrally with a hub 55 which is connected fixedly to the drive journal 52 (cf. threaded pin 56 in FIG. 2). In the direction of the center axis 11, the second ring 62 is supported directly on the first plate 27.

The electric motor 51 is surrounded by an annular second printed circuit board 32. The second printed circuit board 32 bears a plurality of illuminants 90 which are arranged uniformly distributed about the center axis 11. Each illuminant 90 is in the form of an LED which can illuminate in a plurality of colors. The number of illuminants 90 is selected to be of such a size that, whenever all of the illuminants 90 illuminate with the same strength and the same color, the impression of a continuous colored ring emerges on the luminous surface 80. The light-scattering effect of the luminous ring 81 is used here.

Furthermore, the second printed circuit board 32 bears a controller or a driver with which current can be applied to the electric motor 51. The second printed circuit board 32 is connectable to a controlling means via the electrical connection 13 on the first housing body 21, with all of the functions of the compensating element 10 being controllable via said connection. The current supply of the compensating element 10 also takes place via the connection 13.

Furthermore, a first printed circuit board 31 is provided which is arranged on the opposite side of the first plate 27 with respect to the second printed circuit board 32, i.e. within the second housing body 22. The first printed circuit board 31 bears the electronic components of the measurement system 70 with which the relative position between the first and the second assembly can be measured. The measurement system 70 is designed in accordance with DE 10 2015 219 332 A1. The entire contents of DE 10 2015 219 332 A1 are referred to and included in the contents of the present application. The measurement system 70 overall comprises six optical distance meters 72 which are each carried by the first printed circuit board 31. The distance meters 72 are combined into three pairs, the three pairs being arranged distributed about the center axis 11 at an angular distance of 120°. Each pair mentioned is assigned a prism 71 which, in the present case, is in each case formed integrally with the second fastening flange 43. Each prism 71 forms two flat measurement surfaces (No. 73 in FIG. 2), which are arranged inclined with respect to one another by 90°. Each distance meter 72 is assigned a measurement surface, wherein, in the zero position of the compensating element 10, the measurement direction thereof is oriented perpendicularly to the assigned measurement surface and centrally with respect thereto. By means of the six measured distance values, the relative position between the first and the second assembly can be calculated in six degrees of freedom. For this purpose, a nonlinear system of equations has to be solved, which preferably takes place using a gradient descent method. The corresponding calculator in the form of a microcontroller is preferably accommodated on the first printed circuit board 31.

The first printed circuit board 31 is connected to the second printed circuit board 32 via electric lines 33. The first and the second printed circuit board 31; 32 are both accommodated in a fixed position within the first assembly 20. In the region of the balls 61, the first printed circuit board 31 is provided with apertures.

In the present case, the locking mechanism 60 comprises three balls 61 which are arranged distributed uniformly about the center axis 11. Parallel to the center axis 11, each ball 61 is guided movably by means of a guide ring 29. The guide ring 29 is composed of steel, and is pressed into a matching recess in the second main part 24 which is composed of aluminum. The position of the guide ring 29 is secured in a form-fitting manner in the axial direction. The separate guide ring 29 prevents the wear which would arise if the ball 61 were guided directly on the second main part 24.

At the top in FIG. 1, i.e. toward the first plate 27, each ball lies on the locking ring 62 and on the pressure ring 63. The locking ring and the pressure ring 62; 63 are arranged concentrically with respect to the center axis 11, the locking ring 62 being arranged within the pressure ring 63, and therefore the locking ring and the pressure ring 62; 63 directly touch a ball 61 in each case at different locations.

The pressure ring 63 runs with a constant, rectangular cross-sectional shape about the center axis 11. It is supported with three springs 64 on the first plate 27. The springs 64 are designed as helical compression springs, and are arranged distributed uniformly about the center axis 11. The springs 64 are accommodated at both ends in each case in matching recesses of the third ring 63 and of the second plate 28. They are arranged in approximate alignment with an assigned ball 61 in the direction of the center axis 11.

The locking ring 62 lies in a sliding manner with a flat bearing surface 91 directly on a flat surface of the first plate 27. In the direction of the center axis 11, it has a thickness which changes in three periods between a minimum and a maximum over the circumference of the second ring 62. If the three thickness maxima of the pressure surface 92 lie on the balls 61, the first operating state is established, with the compensating element being locked. If the three thickness minima of the pressure surface 92 are arranged in the region of the balls 61, the second operating state is established. The switch between the two operating states is made by the second ring 62 being rotated by means of the electric motor 51.

The balls 61 lie on an assigned, circular-conical ball seat 41, specifically no matter in which operating state the compensating element 10 is in. The ball seat 41 is fixedly connected, in particular screwed, to the second fastening flange 43 via a single-piece extension arm 42. The extension arm 42 penetrates a bore 37 in the second plate 28, the ball seat 41 lying with a damping ring 44 on the edge of the bore 37 on the second plate 28 when the compensating element 10 is in the first operating state or in the zero position. In the second operating state, this contact can be neutralized by the second fastening flange 43 being acted upon with a force. Depending on the direction of said force, at least one ball 61 is moved towards the first plate 27 counter to the force of the respectively assigned spring 64. In the second operating state, the second assembly 40 is therefore supported resiliently on the first assembly 20. If the second assembly 40 is not acted upon with an external force, the spring forces in interaction with the guide rings 29 cause the second assembly 40 to spring back into a defined zero position. They can be clamped in said zero position by means of the second ring 62 in order to establish the first operating state.

Figure 2:
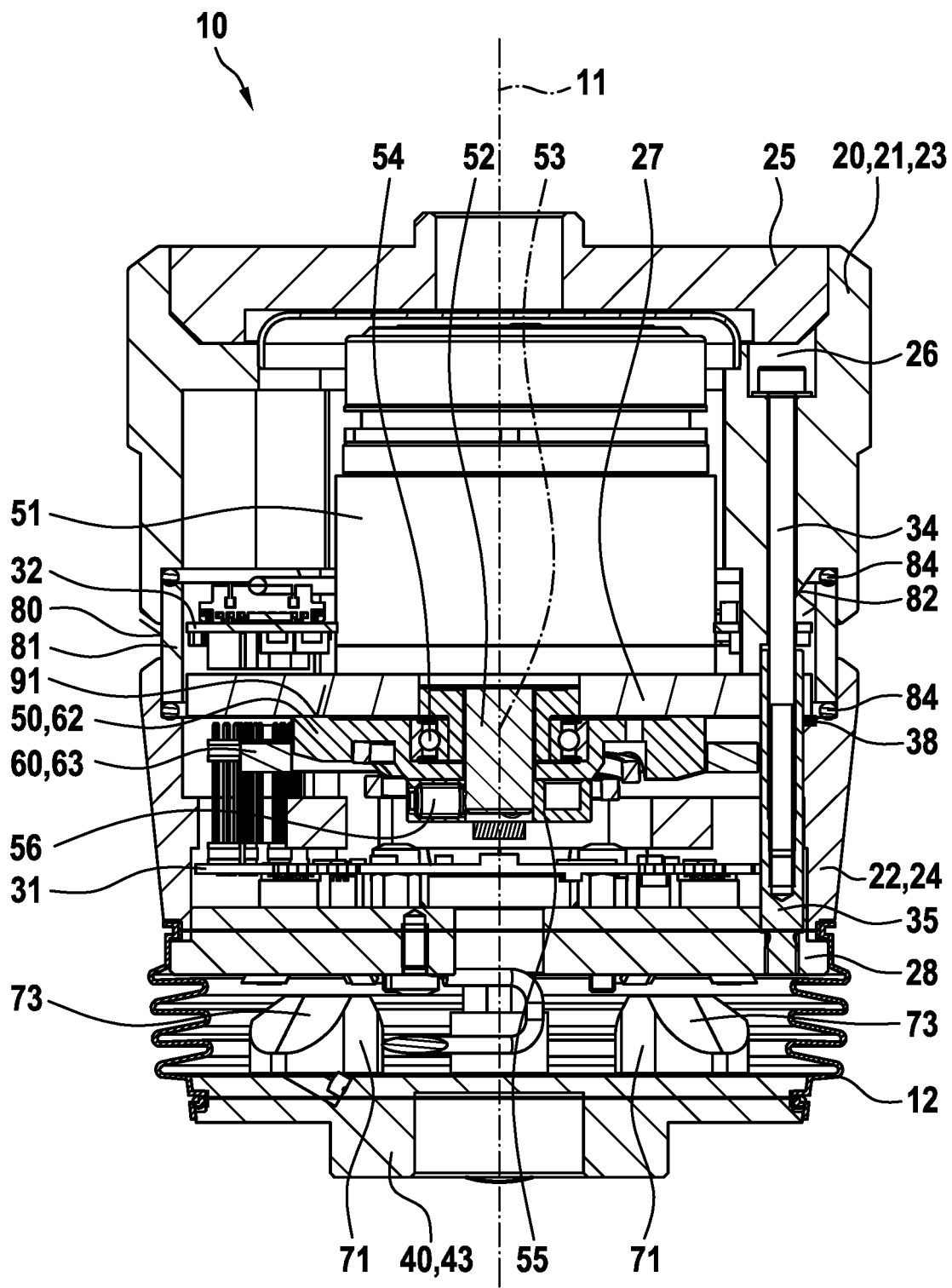
FIG. 2 shows a further sectional view of the compensating element according to FIG. 1.

FIG. 2 shows a further sectional view of the compensating element 10 according to FIG. 1. The sectional plane likewise contains the center axis 11, with the latter being rotated by 90° in relation to FIG. 1. As a result, all three balls 61 are arranged on the other side of the sectional plane.

It can be seen in FIG. 2 how the various parts of the first assembly 20 are screwed to one another. Use is made for this purpose of the screw 34 and the assigned bolt 35 which are each present three times, with the corresponding pairs being arranged distributed uniformly over the circumference of the compensating element 10. The bolt 35 which is parallel to the center axis 11 is screwed by an external thread into the second plate 28. It penetrates the first plate 27 with a circular-cylindrical mating surface such that the first plate 27 is precisely oriented. The screw 34 which is parallel to the center axis 11 penetrates the first main part 23, the screw being screwed into an internal thread of the bolt 35. As a result, the first main part 23 is braced against the first plate 27. The first plate 27 lies via at least one spacer plate 38 on the second main part 24, the latter in turn lying directly on the second plate 28 such that the force flux of the screw 34 is closed. So that the corresponding clamping force is transmitted only in a small portion via the luminous ring 81, the latter is held between two sealing rings 84, with it lying with its luminous surface 80 in sections on the inside of the first and the second main part 23; 24.

Furthermore, two prisms 72 can be seen in FIG. 2. The two corresponding flat measurement surfaces 73 intersect on an imaginary straight line which, in turn, intersects the center axis 11 at a right angle. The two mutually assigned measurement surfaces 73 are arranged mirror-symmetrically with respect to each other.

Figure 3:
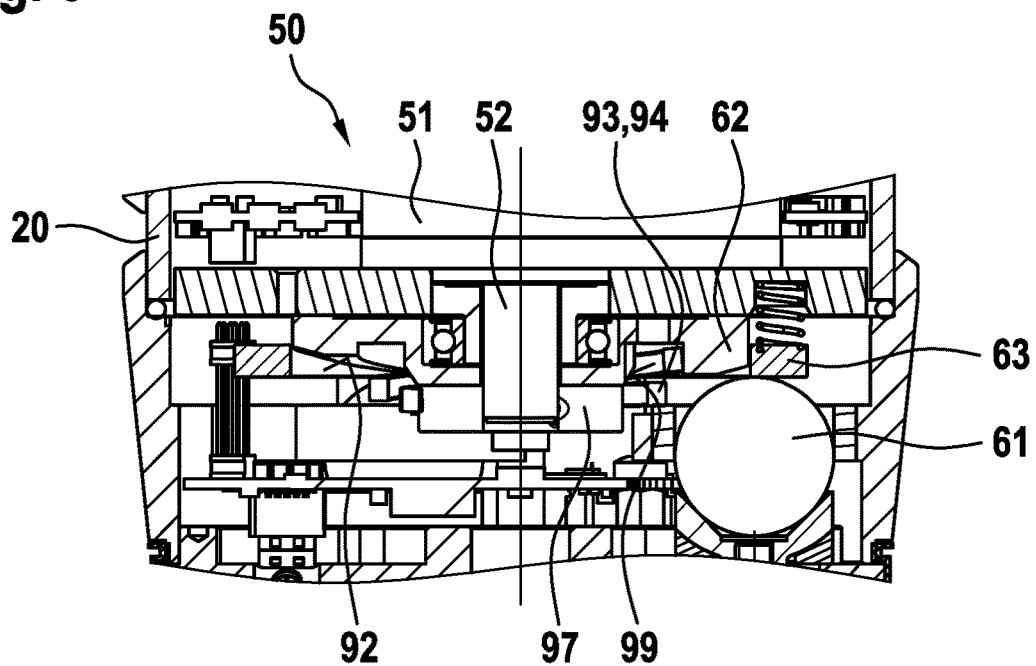
FIG. 3 shows an enlarged detail from FIG. 1 in the region of the torsion spring.

FIG. 3 shows an enlarged detail from FIG. 1 in the region of the torsion spring 93. The torsion spring 93 consists of a spring wire 94 which has a constant, rectangular cross-sectional shape.

In the present case, the spring wire 94 is composed of hardened spring steel. It is wound spirally. In the present case, two complete windings are provided.

For the locking of the balls, the spring wire 94 is rotated in the direction in which the inside diameter of the torsion spring 93 decreases as the rotation increases. At a rotational angle of approximately 50° from the untensioned neutral position, this results in the spring wire 94 butting against the circular-conical surface 99 of the locking ring 62, with the windings of the spring wire 94 also being able to directly abut one another. In each case, an end position is reached. The torsion spring 93 can then no longer be tensioned further. The fastening, explained with respect to FIGS. 4 and 5, at the first and the second end of the spring wire 94 then leads to the drive journal 52 carrying along the locking ring 62 in a form-fitting or stiff manner.

This type of suspension has the result that the drive journal 52 can be accelerated comparatively powerfully in order to rapidly lock the locking mechanism 50. At the moment at which the locking ring 62 with its pressure surface 92 touches the balls 61, a force impact arises. This impact is lessened by the torsion spring 93 in such a manner that the electric motor 51 is hardly loaded. When the end position is reached, the effects of the impact mentioned have been used to such an extent that the rotationally fixed or stiff entrainment now taking place between the drive journal 52 and the locking ring 62 does not result in an excessive stressing of the electric motor.

Figure 4:
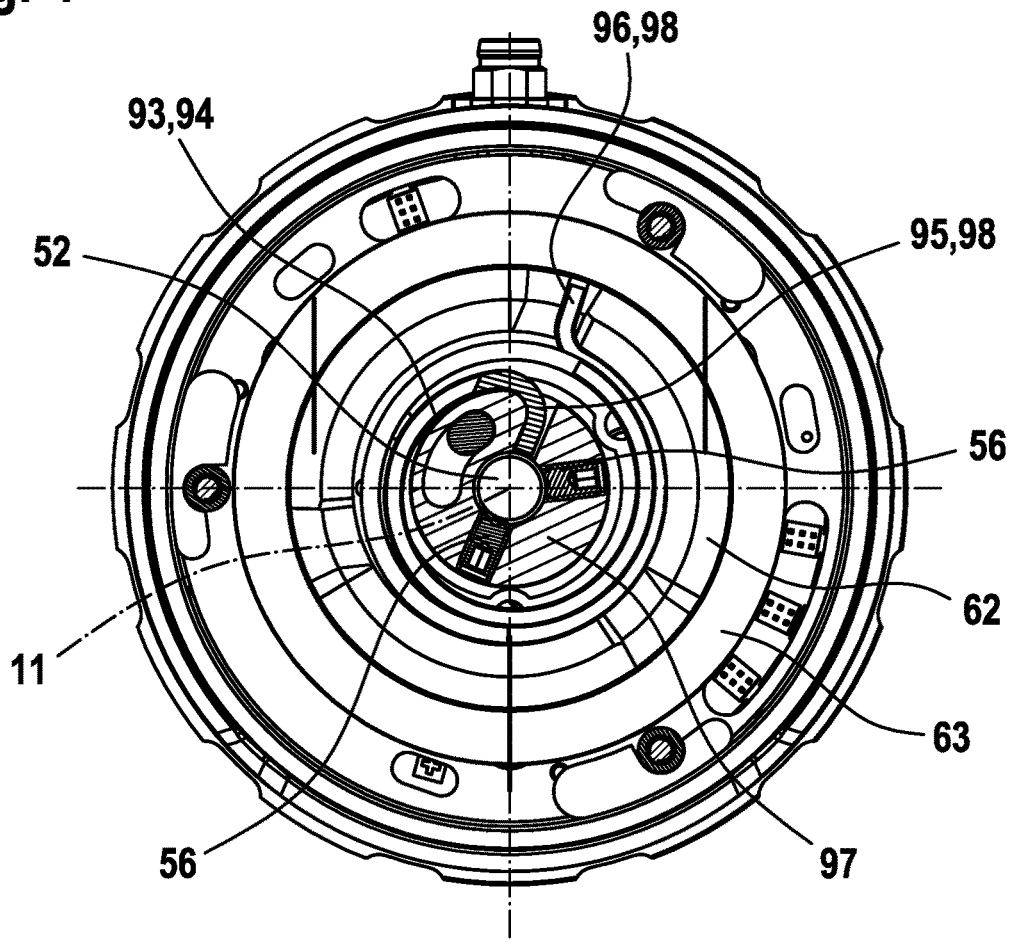
FIG. 4 shows a cross section through part of the compensating element in the region of the first end of the torsion spring.

FIG. 4 shows a cross section of part of the compensating element in the region of the first end 95 of the torsion spring 93. The sectional plane runs perpendicularly to the center axis 11, it intersecting the first end 95 of the spring wire 94. The direction of view is directed toward the first assembly, with the balls being blanked out.

It can be seen that the spring wire 94 has been bent over radially inward by approximately 90° at the first end 95. The corresponding bent-over portion 98, which extends rectilinearly and radially with respect to the center axis 11, engages in a matching recess on a separate carry-along part 97. A form-fitting entrainment between torsion spring 94 and carry-along part 97 is therefore provided.

The carry-along part 97 is clamped to the drive journal 52 of the electric motor by means of two threaded pins 56. The threaded pins 56 each extend radially with respect to the center axis 11. They are recessed in relation to the circular-cylindrical outer circumferential surface of the carry-along part 97. When the end position mentioned is reached, a short section of the spring wire 94 lies on the outer circumferential surface of the carry-along part 97. As can be seen in FIG. 3, the outer circumferential surface mentioned merges into the circular-conical surface (No. 99 in FIG. 3) without a step and without a gap.

Figure 5:
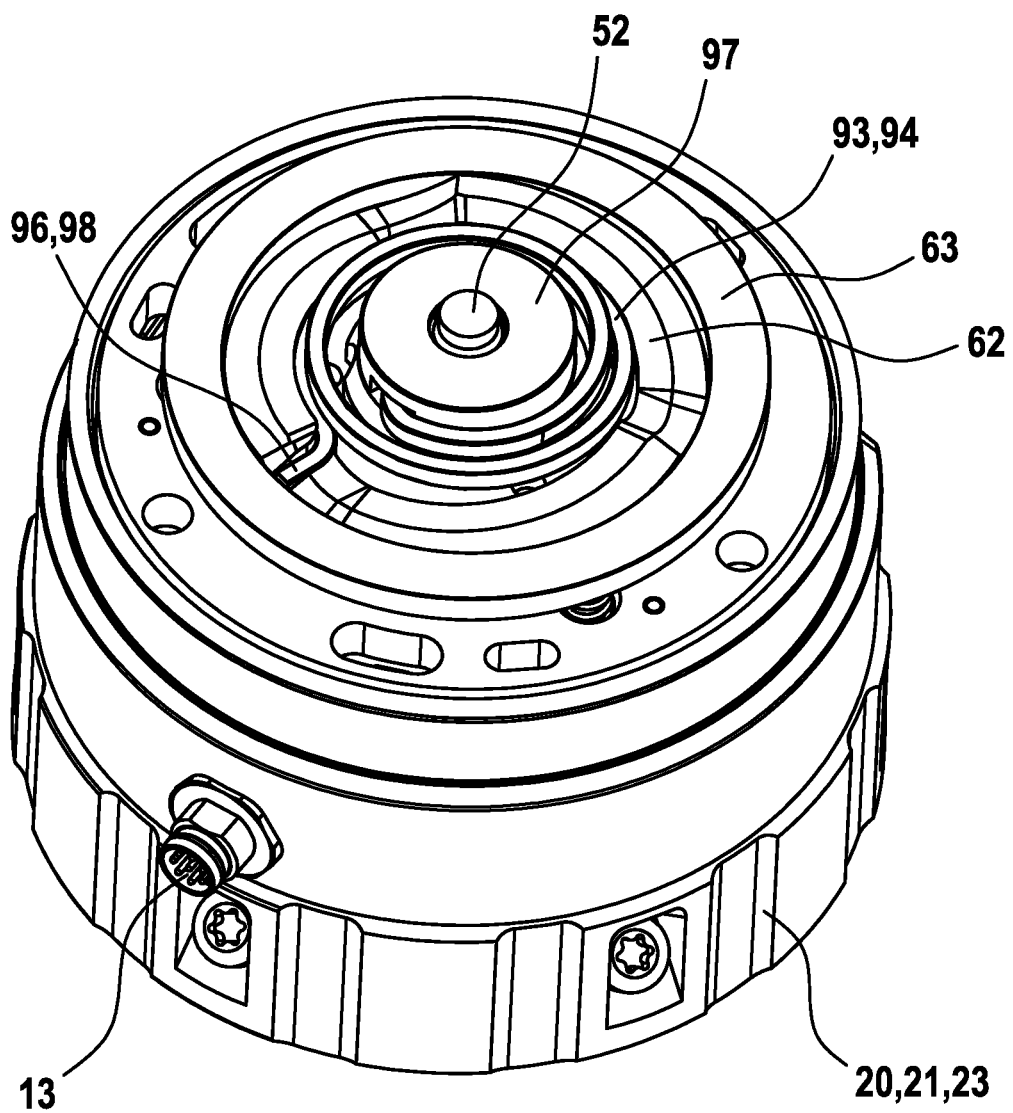
FIG. 5 shows that part of the compensating element which is illustrated in FIG. 4, perspectively and unsectioned.

FIG. 5 shows that part of the compensating element which is illustrated in FIG. 4, perspectively and unsectioned. The spiral course of the spring wire 94 is more clearly visible as a result.

At the second end 96 of the spring wire 94 opposite the first end, a bent-over portion 98 bent over by approximately 90° is likewise provided. The second end 96 of the spring wire 94 faces radially outward in a straight line with respect to the center axis 11. It engages in a form-fitting manner in a matching recess in the locking ring 62. It goes without saying that this recess is arranged in a region of the locking ring 62 that does not touch the balls in any rotational position of the locking ring 62.

REFERENCE SIGNS

10 Compensating element
11 Center axis
12 Expansion bellows
13 Electrical connection
14 System of coordinates
20 First assembly
21 First housing body
22 Second housing body
23 First main part
24 Second main part
25 First fastening flange
26 Cavity
27 First plate
28 Second plate
29 Guide ring
31 First printed circuit board
32 Second printed circuit board
33 Electrical line
34 Screw
35 Bolt
36 Screw
37 Bore
38 Spacer plate
40 Second assembly
41 Ball seat
42 Extension arm
43 Second fastening flange
44 Damping ring
50 Locking mechanism
51 Electric motor
52 Drive journal
53 Axis of rotation of the electric motor
54 Radial rolling bearing
55 Hub
56 Threaded pin
60 Spring mechanism
61 Ball
62 Locking ring
63 Pressure ring
64 Spring
70 Measurement system
71 Prism
72 Optical distance meter
73 Measurement surface 80 Luminous surface
81 Luminous ring
82 Inner circumferential surface of the first ring
84 Sealing ring
90 Illuminant
91 Bearing surface
92 Pressure surface
93 Torsion spring
94 Spring wire
95 First end
96 Second end
97 Carry-along part
98 Bent-over portion
99 Circular-conical surface

The invention claimed is:

1. A compensating element, comprising:
a first assembly;
a second assembly, the first and second assemblies at least partially arranged next to each other in a direction of a center axis of the compensating element; and
a locking mechanism configured to be switched between a first operating state, in which the first assembly is connected fixedly to the second assembly and the first operating state defines a zero position between the first and second assemblies, and a second operating state in which the first and second assemblies are connected to each other via a spring mechanism in such a manner that the first and second assemblies are movable relative to each other, the locking mechanism comprising:
an electric motor configured to switch the locking mechanism over between the first and the second operating states;
at least three balls arranged within the first assembly and distributed about the center axis;
a locking ring arranged concentrically with respect to the center axis and on a side of the at least three balls that faces away from the second assembly, the locking ring being selectively braced and not braced against the at least three balls depending on a rotational position of the locking ring with respect to the center axis; and
a torsion spring via which the locking ring is connected in terms of rotary drive to the electric motor, the torsion spring rotationally elastic about the center axis,
wherein:
the electric motor has a rotatable drive journal arranged concentrically with respect to the center axis,
the locking ring surrounds the drive journal, and
the torsion spring is arranged between the drive journal and the locking ring, as viewed radially with respect to the center axis.

2. The compensating element according to claim 1, wherein the torsion spring comprises a single spring wire which is wound spirally with respect to the center axis, the spring wire having a first end connected to the drive journal for rotation with the drive journal and a second end opposite the first end connected to the locking ring for rotation with the locking ring.

3. The compensating element according to claim 2, wherein at least one of the first end and the second end has a bent-over portion that is bent over at a right angle, and the bent-over portion engages at least indirectly in a form-fitting manner in a corresponding one of the drive journal and the locking ring.

4. The compensating element according to claim 3, further comprising:
a separate carry-along part which is connected fixedly to the drive journal, the bent-over portion of the first end engaging directly in a form-fitting manner in the carry-along part.

5. The compensating element according to claim 4, wherein the carry-along part is clamped against the drive journal with a threaded pin that is oriented radially with respect to the center axis and is accommodated in the carry-along part in a manner completely recessed with respect to an outer circumferential surface of the carry-along part.

6. The compensating element according to claim 2, wherein the spring wire is bent spirally in such a manner that the first and second ends are spaced apart from each other in the direction of the center axis.

7. The compensating element according to claim 6, wherein the spring wire is wound spirally in such a manner that the spring wire defines a circular cone at one of the first and second ends.

8. The compensating element according to claim 6, wherein:
the torsion spring is rotatable from an untensioned neutral position by 30° to 90° to an end position and, from the end position, a stiff rotary entrainment occurs between the drive journal and the locking ring if the direction of rotation of the drive journal remains the same, and
the spring wire has an inner circumferential surface that, in the end position, lies on the locking ring.

9. The compensating element according to claim 8, wherein the locking ring has a surface which is in the form of a circular cone with respect to the center axis and on which the spring wire lies in the end position.

10. The compensating element according to claim 1, wherein the torsion spring is rotatable from an untensioned neutral position by 30° to 90° to an end position and, from the end position, a stiff rotary entrainment occurs between the drive journal and the locking ring when the direction of rotation of the drive journal remains the same.

* * * * *